JAMES C. STERNBERG
INVENTOR.

BY Paul K Harden
ATTORNEY

United States Patent Office 3,435,659
Patented Apr. 1, 1969

3,435,659
RETENTION SPECTRUM ANALYSIS APPARATUS
James C. Sternberg, Fullerton, Calif., assignor to Beckman Instruments, Inc., a corporation of California
Filed June 20, 1966, Ser. No. 558,679
Int. Cl. G01n 31/08
U.S. Cl. 73—23.1                                    16 Claims

ABSTRACT OF THE DISCLOSURE

One embodiment involves a source of carrier gas in series with a flow controller and a sample inlet and a number of chromatographic columns, each of which is followed by a delay, with the output of the last delay being fed into a detector and a source of tracer gas inserted between the detector and the last delay. A second embodiment involves the series combination of a source of carrier gas, a flow controller and a sample inlet with a delay and a number of parallel combinations of chemical modifiers in parallel with a delay and a restrictor, the output of the last parallel combination being connected to the detector and a source of tracer gas being inserted between the last parallel combination and the detector, said tracer being detectable by the detector for the purpose of indicating variations in flowrate of the output. The tracer gas may either be inserted at a constant rate or at fixed thermodynamic activity.

---

This invention relates to apparatus for the qualitative characterization of samples and, more particularly to new and improved apparatus providing a time-related spectrum in its output.

For the identification of substances solely from chromatographic data, it is necessary, except in the simplest cases, to obtain retention data on more than one stationary phase. Methods employing two-column plots, retention volume constants or retention index differences all rely on data from two different columns and experience has shown that data from more than two is highly desirable.

Several apparatus and methods have been developed in the prior art for obtaining such data. One approach of maintaining several chromatographs with appropriate columns or of changing columns in a single chromatograph is wasteful of time and equipment. Various schemes have been advanced by which multi-column retention data can be obtained from a single sample injected into one apparatus. Arrangements in which a sample traverses several columns in series with detectors between them are limited to nondestructive detectors, and require several detectors, as do arrangements in which a sample is split among several parallel columns, each with its own detector. Franc and Michajlova, Journal of Chromatography, vol. 12, p. 22, 1963, have employed four columns in parallel, with the combined effluent passing into a common detector. If the sample has a different retention time on each column, the detector will show four distinct peaks. The use of this parallel column technique suffers from the fundamental disadvantage that the individual peaks cannot be assigned to elution from a particular column. The data although providing a fingerprint of the sample cannot be used for other purposes. A second disadvantage in this type of system occurs when similar retention times on two of the columns have led to the recording of a single unresolved peak.

In my copending application, Ser. No. 435,931, now U.S. Patent 3,386,279, filed Mar. 1, 1965, for Time Resolution Analysis Apparatus there is disclosed an improved apparatus which provides time resolution of the effluent of a single sample component through a plurality of columns. In one form of the apparatus a number of chromatographic columns are connected in series to the input of a detector. A restrictor is also connected from the input of each of the columns to the input of the detector. The last column may be connected directly to the detector or by way of another additional restrictor. If the volumes of the restrictors and connecting lines to the detector are small, the time of transit of samples from each split point to the detector can be made negligibly small. At each restrictor the stream will split and a portion passes through the adjacent column while the other portion passes through the detector. Since the time delay through the restrictor to the detector is very small, a peak occurs at the output of the detector which is indicative of the retention time in the preceding column. It should be noted that the time of injection of the sample need not be separately known, since the first column is preceded by a restrictor. The measured detector response to a single sample will thus provide retention data for all four columns.

The present invention provides new and novel apparatus and methods whereby the time related spectrum of a sample through a plurality of columns may be obtained by utilizing a plurality of columns connected in series. Although providing much of the same data as provided by the apparatus disclosed in my aforementioned copending application the apparatus and method herein disclosed has the advantage of being somewhat simpler, not requiring the manifold disclosed in the aforementioned application. Since the sample is not split after each column as in the prior apparatus the same amount of sample passes each column and can, if desired, be trapped in toto for further study following elution from the final column without ever actually passing through the detector.

The present invention also provides new and novel apparatus for the qualitative characterization of separate components and particularly the rapid identification of functional groups, elemental compositions or other structural features of a sample with the output available on a single recorder.

Other advantages of the invention will become apparent to those skilled in the art as the invention becomes better understood by reference to the following detailed description and the features of novelty which characterize the invention will be pointed out with particularity in the claims annexed hereto and forming a part hereof.

Figure 1:
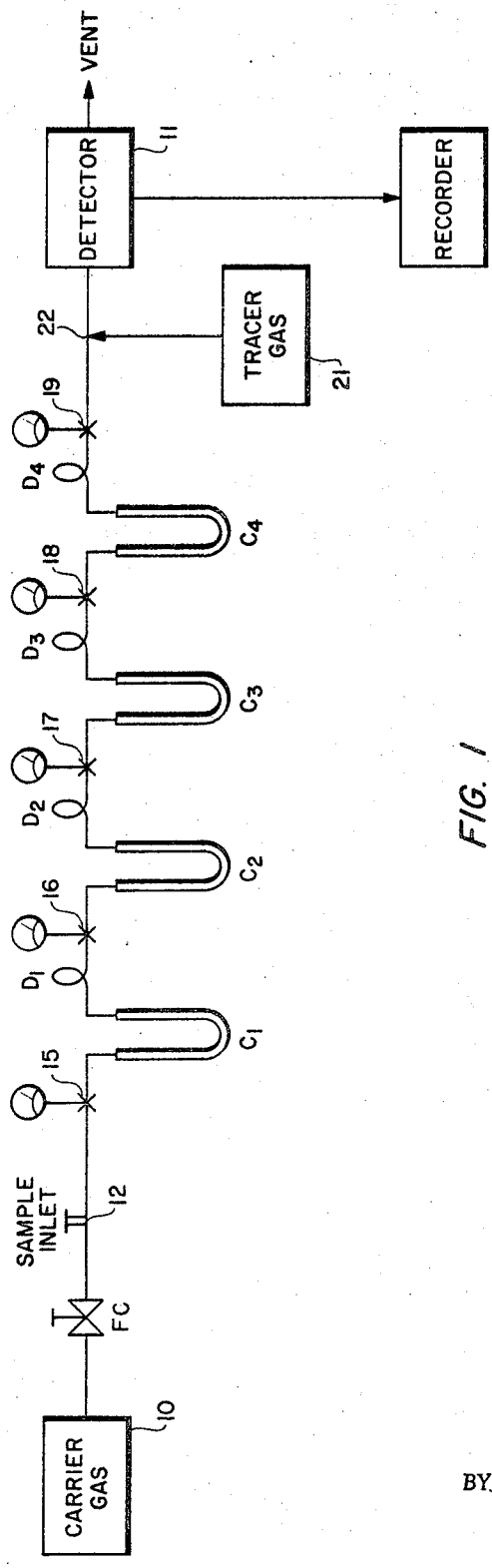
FIG. 1 is a schematic diagram of one embodiment of the invention employing a series of columns and a single detector.

Referring now to FIG. 1 there is illustrated apparatus for measuring the time related spectrum of a sample on a series of columns. A source of carrier gas 10 is connected through flow controller FC and provides a source of carrier gas for columns $C_1$, $C_2$, $C_3$ and $C_4$ connected in series between the flow controller and detector 11. A sample inlet 12 is provided in the carrier gas line between the flow controller and the first column and may comprise any suitable means for introducing a sample such as a sampling valve or a septum for injection by way of a syringe. The columns $C_1$, $C_2$, $C_3$ and $C_4$ are each separated by a delay line $D_1$, $D_2$ and $D_3$ respectively and a forth delay line $D_4$ is interposed between column $C_4$ and detector 11. If desired, a sample trap may be inserted after delay line $D_4$. The delay lines $D_1$–$D_4$ are arranged to provide a sufficient delay to isolate the effects of the sample on the detector when it leaves one column from those effects upon entering the next. Access points 15, 16, 17, 18 and 19 are provided for making pressure measurements within the system which are needed only in the initial start-up of the operating conditions in order to permit expression of retention volumes in standard pressure-corrected units. When the desired flow has been established, the pressure is read at these access points with a pressure gauge or manometer.

A tracer gas is introduced into the carrier gas flow just prior to the detector by any suitable means such as from source 21.

Any type of sensor which will respond to changes in the concentration of the tracer being introduced into the stream may be utilized. If the sensor is concentration sensing, such as thermal conductivity or gas density detectors, electron capture detectors, cross section ionization detectors, spectrophotometers an colorimeters, and the tracer substance is introduced at a fixed flow rate, the signal output of the detector will vary as a function of the flow rate of the carrier gas stream. If the tracer is introduced at a fixed flow rate and the carrier gas stream flow rate increases, the concentration of the tracer will decrease. On the other hand, when the carrier flow rate decreases the tracer concentration will increase. Thus the output of the detector will be inversely proportional to the carrier gas flow. As is well known, when a chromatographic column containing a partitioning agent or adsorbent sorbs a sample there is an accompanying decrease in the carrier gas flow. As the sample comes off the column there is an accompanying carrier gas flow increase. Since the detector 11 is sensitive to carrier gas flow changes, the sorption and desorption of a carrier at column $C_1$ is recorded at the instant of sorption and desorption. The time difference between the sorption and desorption peaks is an accurate measure of the column retention time.

Figure 2:
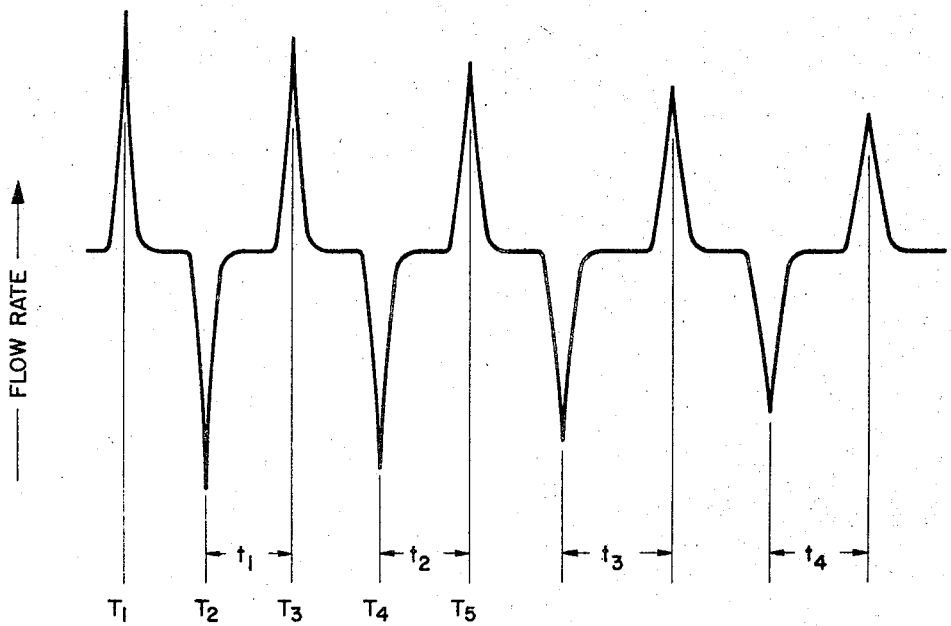
FIG. 2 is a graph of the output of the detector illustrated in FIG. 1 as a function of time.

Referring now to FIG. 2 there is illustrated a record of a retention spectrum from the apparatus of FIG. 1 when each of the columns absorb the sample by varying degrees. Sample injection occurs at $T_1$ and is accompanied by a resulting momentary increase of flow rate of the carrier gas. At $T_2$ the sample enters column $C_1$ and an accompanying carrier gas flow decrease results in increased concentration of the tracer at the detector and therefore a momentary increase in the signal. Upon desorption from column $C_1$ at $T_3$ the carrier gas flow increase momentarily resulting in a decreased tracer concentration, or a negative-going peak. Thus, the retention time $t_1$ is given by the difference between the peaks occurring at $T_3$ and $T_2$. Delay line $D_1$ insures sufficient time between the desorption of the sample from column $C_1$ and its sorption at $C_2$ to resolve these peaks; thus sorption at $C_2$ occurs at $T_4$ with desorption occurring at $T_5$ giving a retention time $t_2$. With a detector of the type that is concentration sensing and the introduction of a tracer gas in the aforementioned manner ahead of the detector, the occurrence of events upstream from the detector which are accompanied by corresponding changes in carrier gas flow rates may be recorded at the instant of occurence. Since the tracer may be introduced immediately preceding the detector, and the detector may be placed remote from the upstream components a wide variety of tracer gases may be utilized since their presence does not affect the carrier gas stream, the sample, or the particular column. It is only essential that the detector be responsive to changes in the concentration of the tracer gas.

A second type detector may be utilized in the system of FIG. 1 which may be sensitive to the rate of introduction of the tracer to the detector. In this system a saturator may be placed in the carrier gas line at 22 for introducing a tracer gas at fixed thermodynamic activity, thus at fixed concentration.

The temperature at which the saturator is held by the constant-temperature bath, thus determining the thermodynamic acivity of the tracer, together with the area of tracer exposed to the fluid stream and the fluid stream flow rate will determine whether or not the tracer reaches equilibrium concentration. For proper functioning over the entire range of flow it is desirable that the tracer always reach equilibrium concentration. Thus, the saturator must be constructed so that the extent thereof is sufficient to insure equilibrium concentration of the tracer at the highest expected fluid flow rate. The saturator temperature should be maintained sufficiently low that the tracer activity is below that which would correspond to equilibrium with the connecting tubing between the saturator and the detector, so that the tracer activity is actually determined by the temperature in the saturator. If the sensor is rate of introduction sensitive and if the sensor has an absolutely known response, then the output of the detector becomes a measure of the carrier gas flow completely independent of what gases are employed or measured.

Several rate of introduction sensors are well known in the art such as the hydrogen flame ionization detector or the Hershch galvanic cell. A suitable example of the hydrogen flame ionization detector is described in Chapter 18 of Gas Chromatography, Academic Press, New York, 1962, and in the copending application of W. Gallaway and A. Seibel, Ser. No. 347,749 for Flame Ionization Detector, now U.S. Patent No. 3,372,000, assigned to the assignee of the instant application. These detectors are responsive to most organic compounds which can be introduced into the system as tracer substances by a suitable saturator. A suitable example of the Hersch galvanic cell is illustrated in FIG. 2 of U.S. Patent 3,258,411. For use in the instant invention the conversion unit 58 of FIG. 2 of said patent would be replaced by an iodine saturator. Such sensors measure the rate at which the sensed gas is introduced into the detector, and, since the carrier gas is always saturated with tracer, variations in the amount of tracer introduced at the detector are directly proportional to variations in the rate of flow of the carrier gas. A more complete description of the operation of the rate of introduction sensor as a flow monitor may be found in my copending application, Ser. No. 558,787, entitled Apparatus and Method for Flow Monitoring, filed concurrently herewith and assigned to the assignee of the instant invention.

With the foregoing apparatus a retention spectrum of a sample for the differing columns $C_1$–$C_4$ may be obtained with a single injection of the sample over a relatively short time. Since relative retention values are widely tabulated, comparison of the retention spectrum of a sample component with that of a reference substance provides a means of qualitative identification. In addition, the retention spectrum of a new component or components may be readily obtained for utilization in column design. For example, with the knowledge of pressure, temperature and overall flow, complete retention information is furnished for a component on several columns with a sample in a single sample run. The run can be repeated at a second temperature to give complete information of the effect of temperature on retention in each column, or a system may be constructed in which a series of columns at one temperature is followed by a similar series at another temperature still utilizing only a single detector. The number of columns interposed between the sample inlet and the detector is restricted only by the ultimate loss in sensitivity as the sample band becomes more and more diffuse after traversing several columns.

Figure 3:
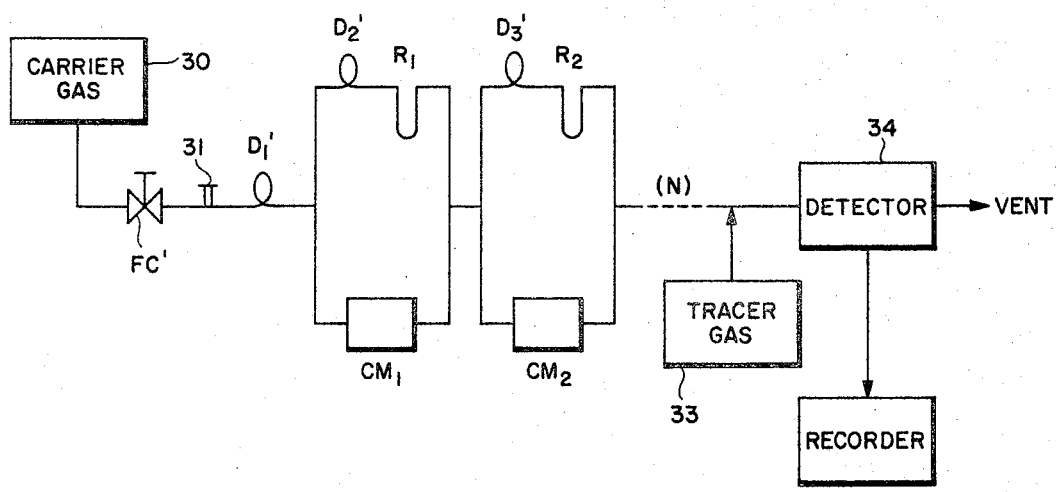
FIG. 3 is a schematic diagram of a second embodiment utilizing selective chemical modifiers for the characterization of an unknown sample.

Referring now to FIG. 3 there is illustrated a system for the characterization and identification of a sample component by its various chemical characteristics. Carrier gas from source 30 passes flow regulator FC' into a system which is provided with a sample inlet 31 which may be a septum or sampling valve. A delay line $D_1'$ is provided in the main conduit after which the sample encounters a series of chemical modifiers $CM_1$, $CM_2$, $CM_n$ having connected in parallel therewith respectively a delay line and a restrictor. Thus delay line $D_2'$ and restrictor $R_1$ are connected in parallel with chemical modifier $CM_1$ and delay line $D_3'$ and restrictor $R_2$ are connected in parallel with chemical modifier $CM_2$. Any other number ($n$) of such groupings may be provided. A tracer gas is introduced into the conduit from tracer gas source 33 upstream of detector 34 which may be located at any point within the system prior to where the carrier gas is vented. Detector 34 may have its output connected to a recorder to provide a permanent record of its output as a function of time.

The sample after injection at 31 is divided at the various split points into a stream through a selective modifier, such as $CM_1$ and a stream through the delay line and its restrictor, such as $D_2'$, $R_1$. When the sample hits such a grouping it is divided in a preset ratio such as a fraction $$\frac{n}{n+1}$$

which flows through the chemical modifier and a fraction $$\frac{1}{n+1}$$

which flows through the delay line and the restrictor. The delay line and restrictor are chosen to match the volume and restriction of the chemical modifier.

If the detector 34 measures the concentration of the tracer gas passing therethrough, the output of the detector is proportional to the flow rate of the carrier gas through detector 34. As in the previous embodiment, the detecting system may comprise a saturator and a rate of introduction detector. In either case the detector output will be a measure of flow in the system. Let it now be presumed that the chemical modifier $CM_1$ is such as to remove a component from the introduced sample. This is accompanied by a resulting decrease in carrier gas flow in a step-wise function. The time of decrease indicates which chemical modifier removed the sample while the magnitude thereof indicates how much of the sample was removed. This results in a binary record of the form indicating that a particular component was present, since it was removed by the first chemical modifier, or that this component was not present, since it was not removed. Any number of chemical modifiers may be provided to provide an identification of the sample from the various components either present or absent from the system. As an example, the first chemical modifier or trap $CM_1$ may comprise concentrated $H_2SO_4$ on glass beads and the second modifier or trap $CM_2$ a solution of $AgNO_3$ in N-methyl pyrrolidone on glass beads. In the following binary table "1" indicates that the sample passes the trap and "0" indicates that it does not.

| Sample | $CM_1$ | $CM_2$ |
| --- | --- | --- |
| Hexane | 1 | 1 |
| Propylene | 0 | 0 |
| Methyl iodide | 1 | 0 |
| Diisopropyl ether | 0 | 1 |

It is seen that with only two chemical modifiers, four samples may be distinguished. As hereinbefore indicated the downstream detector will provide an output change when the flow rate of the carrier changes upon removal of component by the trap at the time such reaction occurs.

Chromatograph columns such as $C_1$–$C_4$ and chemical modifiers, such as $CM_1$ and $CM_2$ are herein defined as "active elements" and this term is meant to apply, hereinafter in the claims, to any such devices which selectively change flow rates of one or more constituents with respect to others. A restrictor, such as restrictors $R_1$ and $R_2$, shown in FIGURE 3, do not change relative flow rates of one component or constituent with respect to another and are not considered "active elements."

There has been illustrated and described an apparatus in which a retention spectrum or identification of a sample may be obtained utilizing a series of columns or chemical traps and a single detector which is capable of recording events occurring upstream from the detector at the time of occurrence. The apparatus and methods disclosed may also be utilized in evaluating column design for use with particular samples and provide convenient reference retention spectrum for a particular sample in a single sample run. The apparatus is also useful in quantitative and qualitative identification of samples.

While the invention has been described in connection with the illustrated embodiment it is to be understood that many variations and modifications thereof are possible and will be obvious to those skilled in the art in light of the teachings herein contained without departing from the spirit and scope of the appended claims.

What is claimed is:
1. A fluid analysis apparatus comprising:
   means for providing a flow path for a fluid stream;
   means for introducing a sample into said stream;
   at least two active elements connected in series in said fluid stream which produce a change in the flow upon contact of the sample therewith;
   means for continuously introducing a tracer substance into said stream at a location downstream from said elements;
   sensor means sensitive to the tracer for detecting and indicating changes in the flow of said tracer substance as a function of time, the sensitivity of sensor to said tracer substance being substantially unaffected by presence of other substance in said fluid stream, whereby corresponding changes in the flow of said stream due to the action of said elements on a sample can be determined.
2. The fluid analyzer of claim 1 wherein said tracer substance is introduced at a fixed flow rate and said sensor detects and indicates the relative concentration of said tracer substance in said fluid stream.
3. The fluid analyzer of claim 2 wherein said sensor means includes a thermal conductivity detector.
4. The fluid analyzer of claim 1 wherein said tracer is introduced in said fluid stream at fixed thermodynamic activity and said sensor detects and indicates the quantity per unit time of tracer substance introduced to said detector.
5. The fluid analyzer of claim 4 wherein said means for introducing said tracer substance comprises a thermostated iodine saturator and said sensor is an iodine sensitive galvanic cell.
6. The fluid analyzer of claim 4 wherein said tracer substance is an organic compound and said sensor means a hydrogen flame ionization detector.
7. The fluid analyzer of claim 1 wherein said active elements comprise chromatographic columns.
8. The analyzer of claim 1 wherein said active elements comprise selective chemical traps.
9. The analyzer of claim 2 wherein said active elements comprise chromatographic columns.
10. The analyzer of claim 3 wherein said active elements comprise chromatographic columns.
11. A fluid analysis apparatus comprising:
   a continuous conduit system for conducting a fluid stream therethrough;
   means for connecting said conduit system to a source of carrier fluid;
   means connected in said system for introducing a sample to said carrier fluid;
   at least two chromatographic columns connected in series following said sample introduction means in the conduit system;
   delay means connected between each of said columns such that elution of fluid from one column is time separated from introduction of said fluid to the subsequent column;

means connected in said system downstream of the last of said columns for continuously introducing a tracer substance to said fluid stream;

sensor means sensitive to the tracer for detecting and indicating changes in the flow of said tracer substance as a function of time, the sensitivity of sensor to said tracer substance being substantially unaffected by the presense of other substance in said fluid stream, whereby various processes accompanied by corresponding changes in fluid flow occurring upstream of said sensor and tracer introducing means may be indicated as each occurs.

12. The fluid analysis apparatus of claim 11 wherein said tracer substance is introduced to said fluid stream at a fixed flow rate and said sensor detects the relative concentration of said tracer substance in said fluid stream.

13. The fluid analysis apparatus of claim 12 wherein said sensor is a thermal conductivity detector.

14. The fluid analysis apparatus of claim 11 wherein said tracer substance is introduced at a fixed thermodynamic activity.

15. The fluid analysis apparatus of claim 14 wherein said tracer substance introducing means includes a thermostated iodine saturator and said sensor is an iodine sensitive galvanic cell.

16. The fluid analysis apparatus of claim 14 wherein said tracer substance is an organic compound and said sensor is a hydrogen flame ionization detector.

References Cited

UNITED STATES PATENTS

| | | | |
|---|---|---|---|
| 3,117,225 | 1/1964 | Willis | 250—43.5 |
| 3,304,170 | 2/1967 | Hinsvark | 75—34 |
| 3,068,686 | 12/1962 | Harmon | 73—23.1 |
| 3,120,749 | 2/1964 | Paglis et al. | 73—23.1 |
| 3,156,548 | 11/1964 | Perry | 73—23.1 |
| 3,177,700 | 4/1965 | Sier | 73—19 |

OTHER REFERENCES

Pecsok, Robert L.: Principles of Gas Chromatography, 1959, John Wiley & Sons, pp. 132 and 133.

RICHARD C. QUEISSER, *Primary Examiner.*

VICTOR J. TOTH, *Assistant Examiner.*

U.S. Cl. X.R.

73—194